Dec. 24, 1929.  J. M. KEELER  1,740,602
CONVERTIBLE FAUCET
Filed April 5, 1928  2 Sheets-Sheet 2
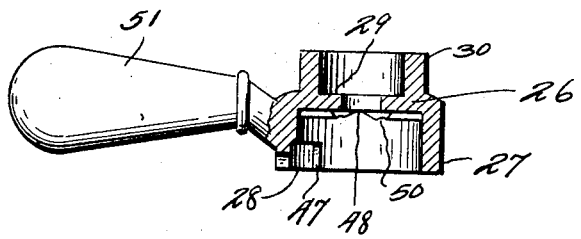
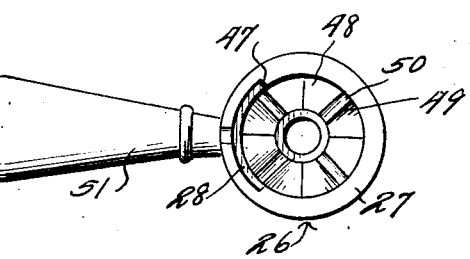
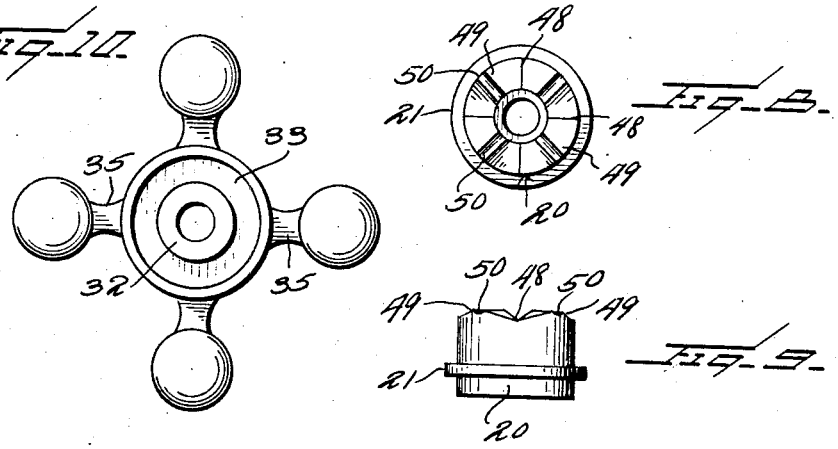
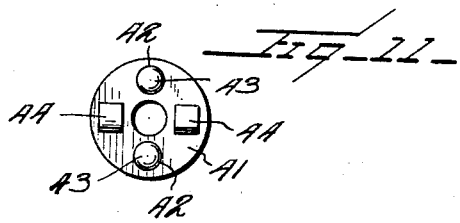
INVENTOR.
J. M. Keeler
Watson E. Coleman
ATTORNEY.

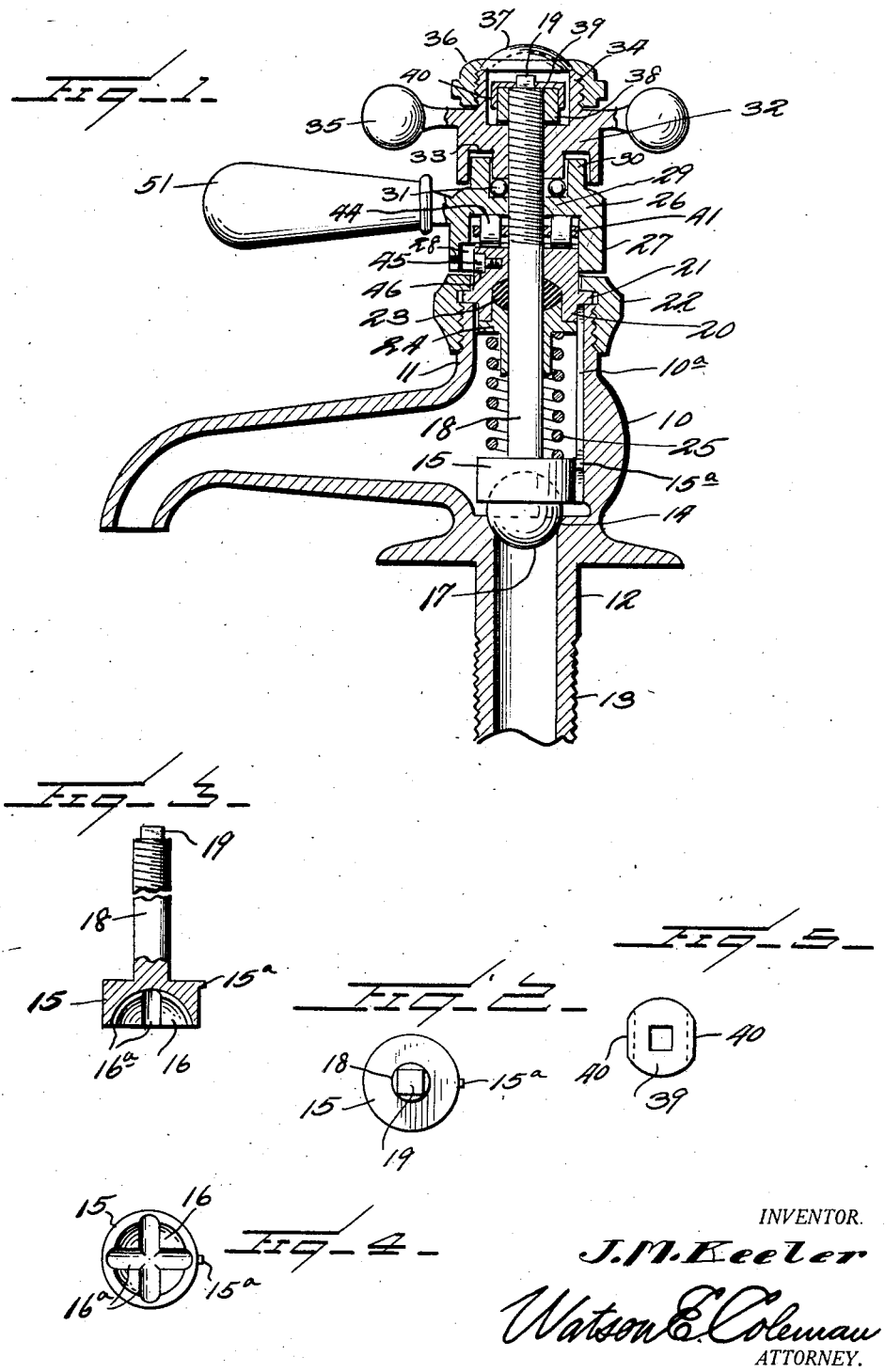

Patented Dec. 24, 1929

1,740,602

UNITED STATES PATENT OFFICE

JOHN M. KEELER, OF NEW BRIGHTON, PENNSYLVANIA, ASSIGNOR OF ONE-HALF TO CHARLES R. WELSH, OF NEW BRIGHTON, PENNSYLVANIA

CONVERTIBLE FAUCET

Application filed April 5, 1928. Serial No. 267,640.

This invention relates to faucets, bits, taps and other discharge controlling devices of the same general character, and the general object of the invention is to provide a convertible faucet, bib cock or the like which may be used for the control of the discharge in three different ways so that it may be termed a three-in-one faucet, and which is so constructed that one handle of the faucet may be operated to turn on either a fine or small stream or on full to draw a full stream, or the second handle may be operated to draw water and then when the handle is released the handle will automatically return to its faucet-closing position or said handle may be shifted to a full on position and left so for any desired length of time.

A further object is to provide a faucet which can be adjusted right or left handed to draw any amount of water desired or which can be set for self-closing, as may be desired, by merely setting the stop screw, the stop screw, when not set, enabling the faucet to be opened so as to draw any amount of water with the faucet left in this position.

A still further object is to provide a ball valve resiliently urged to its seat, which will stand up under a spring tension of from ninety to one hundred pounds seating pressure for a period of from five to six months in case the water is shut off during that length of time.

Another object is to provide a seat which will give a much greater seating surface than is given in the faucet used at the present time.

Still another object is to prevent glazing or setting of the packing gland through which the valve stem passes.

A further object is to provide coacting cams and balls operating over the cams to raise or lower the valve, and provide rollers operating upon said tracks made by said balls and chasing the tracks so as to prevent the balls used in connection therewith from scoring the tracks or turning up a burr thereon.

A still further object is to provide a valve of this character which is very greatly superior to the ordinary screw compression flat seated faucet, which may be readily and cheaply manufactured in comparison therewith, and which is provided with a re-seating ball valve.

Other objects will appear in the course of the following description.

My invention is illustrated in the accompanying drawings, wherein:—

Figure 1 is a vertical sectional view of a faucet constructed in accordance with my invention;

Figure 2 is a top plan view of the ball valve holder and valve stem;

Figure 3 is an elevation partly in section of the valve stem;

Figure 4 is an under side plan view of the valve stem and ball valve holder;

Figure 5 is a top plan view of the nut lock;

Figure 6 is a sectional view through the female cam;

Figure 7 is an under side plan view thereof;

Figure 8 is a top plan view of the male cam;

Figure 9 is a side elevation thereof;

Figure 10 is a top plan view of the rotative handle;

Figure 11 is a top plan view of the ball and roller carrier.

Referring to these drawings, 10 designates the body of a faucet constructed in accordance with my invention, the body having an upwardly extending neck 11 screw-threaded at its upper end and having a downwardly extending portion 12 which is exteriorly screw-threaded, as at 13, and the interior of the body being formed to provide an annular, downwardly and inwardly extending seat 14. Disposed within the faucet is a ball holder 15 whose under face is concaved, as at 16, and disposed within this concavity is a ball valve 17. This valve may be made of any suitable material as, for instance, rubber. The inner face of the concaved portion has intersecting grooves $16^a$, as shown in Figure 4, and the head 15 is formed with an outwardly projecting lug $15^a$ which engages in a vertically extending groove $10^a$ formed in the body 10 so that neither the valve head nor its stem can turn. The valve holder or head 15 has the valve stem 18 which is screw-threaded adjacent its upper end and this upper end terminates in a squared portion 19.

The stem 18 extends upward through the portion 11, being centered with relation thereto.

Disposed above the upper end of the portion 11 of the body of the faucet is an annular cam member 20 which is formed with an outwardly projecting flange 21 which seats against the upper end of the portion 11 of the faucet and is held thereto by means of the coupling ring 22 which has screw-threaded engagement with the portion 11 and which is grooved to receive the annular flange 21. The under face of this member 20 is concaved to receive the packing 23 held in position around the stem or spindle 18 by means of the packing gland 24. This packing gland has a central passage through which the spindle passes, and the packing gland is held up against the packing 23 by means of a coiled compression spring 25. This spring 25 at its lower end bears against the head or ball valve holder 15 and acts, of course, to urge the valve stem downward and the valve 17 against the seat 14.

The upper face of the member 20 is formed with a plurality of alternate crests and valleys, as shown in Figure 8, whose detailed construction will be later stated. Disposed above the cam member 20 is a female cam piece or member 26. This is formed with a marginal flange 27 which is cut away for a portion of a circle, as at 28. The under face of this cam piece is formed with alternate crests and valleys, while the upper face of the cam piece 26 is provided with a ball race 29 defined by the upwardly extending, annular wall 30. The balls 31 are disposed within this race and surround the central spindle.

Disposed above the female cam piece 26 and having screw-threaded engagement with the spindle is a screw-handle 32. The under face of this handle 32 is formed to provide an annular recess 33 to receive the upwardly extending flange 30, the central portion of the handle bearing on the balls 31. The upper face of the screw-actuating handle has the upwardly extending screw-threaded portion 34. This member is also formed with the radial arms 35 preferably having balls at their extremities and constituting radial handles whereby the handle piece may be turned. A collar 36 has screw-threaded engagement with the upstanding flange 34 and this collar holds a portion of an index member 37 in place therein forming an ornamental closure for the top of the faucet. Disposed to engage the upper end of the valve stem is a nut 38, and extending over this nut is the lock nut plate 39 having a central opening which fits the squared end 19 of the valve stem and which has two nut-embracing portions 40.

Disposed between the two cam sections 20 and 26 is a ball carrier 41 which is preferably formed with oppositely disposed openings 42 of a diameter to each receive a ball 43 and disposed in quartering relation to the openings 42 are the two rectangular openings which receive therein the anti-friction rollers or abutments 44. A stop screw 45 is carried in a countersunk recess 46 in the cam piece 20 and this stop screw may be either turned outward so that it is operable within the slot 28 to limit the movement of the cam piece 26 or else it may be turned home within the countersink so that the outer face of its head is flush with the outer face of cam piece 20 and will not project out and limit the degree of oscillation of the member 26.

It will be seen from Figure 7 that the slot 28 is substantially a quarter circle and the ends of the slot constitute shoulders 47 which, when the screw 45 is turned outward, limit the movement of the female cam piece upon the male cam piece. The upper face of the male cam piece 20 is formed to provide four valleys 48 disposed in quartering relation, and intermediate each of these valleys there is a radial crest 49 formed with a radial seat 50. The female cam piece 26 is also formed with these crest seats 50 and with the valleys 48 and the crests 49 or cams. Attached to the female cam piece 26 is a handle 51 which extends radially outward and when the handle is turned in one direction or the other the cam piece 26 will be raised in riding over the balls 43 until the crest is reached and then the rollers 44, which constitute abutments against which the cam bears, will drop into the seats 50, thus tending to lock the parts in this position, with the cam piece 26 relatively raised with relation to the cam piece 20 and thus lifting the valve from its seat. If the handle 51 is not turned sufficiently for this purpose but if the female cam piece is turned so that the rollers 44 nearly reach the crest of the cam piece, then upon a release of the handle, the compression spring 23 exerting strain upon the spindle will cause an immediate reverse rotation of the cam piece to its initial position and the valve will be closed automatically. Thus by turning the handle 51 partially, the valve will be opened but will automatically close as soon as the handle is released. By turning the handle further in this same direction, the valve will be locked in its fully opened position until the handle is manually turned to its initial position or manually shifted until the rollers are moved past the seat 50.

The function of the stop screw 45 is as follows: When the stop screw 45 is turned outward, it so limits the movement of the cam member 26 that the balls and rollers carried by plate 41 cannot engage within the locking depressions 50, or in other words cannot pass beyond the crests 49. As a consequence, as soon as the handle is released the spring 25 will act to return the ball valve 17 to its closed position, and it is to be noted in this connection that the handle 51 may be turned in either direction, either to the right or to the left, with exactly the same result that when the handle is released the female cam piece will return to its valve-closing position with all of the balls and rollers disposed within the valleys. If, however, the stop screw 23 be turned fully inward, then there is no limit to the movement which may be given to the female cam piece by means of the handle 51, and if it be desired to fully open the valve and keep it fully opened for any desired length of time, then the handle may be turned so as to carry the female cam piece so far around that the balls and rollers of the ball carrier 41 will engage in the recesses 50 at the crests of the cams 49 and when so engaged the female cam piece and handle will be held in this position until manually turned to move the balls and rollers past the crest of the cam piece, whereupon the spring will cause the ball valve to close under the action of the spring. The advantage of using the balls 43 and the rollers 44 is that the rolls chase the ball tracks so as to keep down the ridge or fin that the balls will make upon the tracks. While I have illustrated the use of two balls and two rollers in the carrier 41, I do not wish to be limited to this as all rolls may be used or all balls.

One of the advantages of my invention resides in the use of the inside packing ring or gland 24. There is scarcely any tension placed upon the packing ring when the faucet is not in use. Where there is constant tension or great tension upon the packing ring as, for instance, due to the pressure of a spring, there is a tendency for the packing to set and glaze. My mechanism, however, allows the packing to "come and go" when the faucet is in operation, that is, contract and expand.

This faucet can be used, as before remarked, either for a right or left handed position. It may be porcelain, white or any other desirable color, or can be finished plain and given a light blue coat or oxidized color or can be nickel-plated. This faucet can be produced for less than one-half the cost of the present faucet and requires less than one-half of the operations now necessary for faucets and less than one-half of the machinery and machine tools now necessary.

The spring 25 will preferably have a tension sufficient to resist between sixty-five to seventy pounds pressure. The street pressure, for instance in the pipe 13, will be at one hundred pounds per square inch. The opening through the valve seat is approximately one-half inch and this will cut the street pressure against the valve ball to from thirty-five to forty pounds. This will leave the actual seating pressure of the spring at about twenty to twenty-five pounds. Thus it will be seen that the spring will at all times force the valve to its seat and hold it against the pressure of the water until the handles are manipulated to raise or lower the valve.

This faucet has been designed particularly for doctors, dentists and barbers and to suit certain specific circumstances, the faucet being so constructed that a continuous fine stream of water can be secured, if desired, without holding the lever handle 51. The amount of water discharged, of course, may be controlled by adjusting the screw-threaded head or nut 32. By this arrangement, the faucet can be so adjusted as to permit more or less a constant stream and then the stream may be increased by operating the handle 51 or the faucet may be operated entirely by operating the handles 35 on the nut 32, or by shifting the handle 51 slightly the valve may be raised and then upon a release of the handle 51 the valve returned to its seat, or 51 may be turned sufficiently so that the rollers 44 will rest in the seats at the apices of the cams and thus the valve may be held open for any desired length of time without the necessity of manually holding the valve handle.

In my construction, the packing 23 will not glaze as would be the case where the packing gland is screwed up tightly against the packing and remains for weeks and months. The packing 24 is made of a suitable grade of rubber which will compress under pressure and expand when released, and inasmuch as there is no tight set in this rubber but only the pressure of the spring 25 this packing will not become glazed or hard. The faucet may be made either self-closing or otherwise, as desired by the proper adjustment of the screw 45. The recess in the head 15 which receives the ball 17 is transversely or radially grooved in order to prevent the ball from sticking within the head.

While I have illustrated certain details of construction and arrangement of parts, I do not wish to be limited to this as it is obvious that many changes might be made therein without departing from the spirit of the invention as defined in the appended claims.

I claim:—

1. A faucet of the character described including a body having a valve seat, a valve therein, one manually operable means whereby the valve may be raised from its seat or seated, and a second manually operable means including a rotatable handle whereby the valve may be raised or seated, and adjustable means to either cause automatic return of the valve to its seat when said handle is released or permit the handle to be turned to a position where the valve is held open until the handle is manually moved toward its initial position.

2. A faucet of the character described including a body having a valve seat, a valve therein, a spring urging the valve closed, a stem on the valve, a cam shiftable around the stem as an axis and means co-operating with the cam and acting when the cam is shifted from an initial neutral position to raise the valve against the action of the spring and when returned to its initial position to permit the closing of the valve, said cam being formed upon its face with means to cause the valve to remain open until the handle is manually returned to its initial position.

3. A faucet of the character described including a body having a valve seat, a valve coacting therewith and having a stem extending up through the body, a spring urging the valve to its seat, a horizontally movable cam mounted for rotation around the spindle as upon an axis and having a handle, said cam having a valley and a crest and at the crest having a seat, an abutment against which the cam bears, said abutment adapted to engage said seat in the crest when the cam is turned a sufficient distance to carry the seat into coincidence with the abutment, and adjustable means in one position limiting the movement of the cam to prevent the seat and abutment coacting and permit the pressure of the spring to return the valve to its seat when the handle is released and in the other position permitting the cam to be manually turned to bring the abutment in engagement with the seat and thus hold the valve open until the cam is manually returned to its initial position.

4. A faucet of the character described including a body having a valve seat, a valve therein having a valve stem, a spring urging the valve toward its seat, a carrier disposed concentrically to the stem and having anti-friction members therein, a manually operable cam having a handle disposed immediately above the carrier and oscillatable around the stem, the cam being formed on its face confronting the carrier with a valley and a crest, the crest being formed with a seat for an anti-friction member, and adjustable means in one position permitting the cam to be shifted to cause the cam to ride upward upon the anti-friction member to the crest but preventing the anti-friction member from entering the seat in the crest to thus permit the return of the valve to its closed position when the handle is released, said adjustable means in its other position permitting the cam to be shifted sufficiently far to permit the anti-friction member to enter the seat in the crest and thus hold the valve raised until the handle is reversely shifted to its initial position.

5. A faucet of the character described including a body having a valve seat, a valve coacting therewith and having a stem held from rotation, a spring urging the valve to a closed position, a member surrounding the stem, a carrier disposed above the member and carrying a plurality of rollers, a cam surrounding the stem and disposed above the carrier and having a handle, the inner face of the cam being formed to provide a plurality of crests and a plurality of valleys, each crest having a roller seat, the first named member having adjustable means in one position limiting the oscillation of the cam from a position where the rollers are disposed in said valleys to a position where the rollers are disposed upon the crests but not in said seats and adjustable in another position to permit the cam to be turned sufficiently far to cause the rollers to seat in said seats and thereby hold the cam with the valve open until the cam is manually returned to its initial position.

6. In a structure of the character described, a stem, a ball carrier mounted upon the stem and having anti-friction balls rotatably mounted therein, anti-friction rollers mounted therein, and a cam having a cam face confronting said rollers and balls, the cam being rotatively engaged with the stem and acting to shift the stem in one direction or the other as the cam is rotated, the rollers acting to chase the tracks made by the anti-friction balls.

7. A faucet of the character described including a body having a valve seat, a valve coacting with the seat, a stem extending upward from the valve and from the body, a member engaged with the body and through which the stem passes and having a cam face upon its upper end, a packing gland surrounding the stem, a spring bearing against the packing gland and the valve and urging the valve to a closed position, a carrier disposed above the cam face of said member and having anti-friction elements mounted therein, a second manually rotatable cam member having a cam face confronting said carrier, said second named cam member being rotatable around the stem but operatively engaged with the stem for coincident longitudinal movement, said cam members having their confronting faces formed to provide a plurality of radiating valleys and intermediate radiating crests, each of the crests being formed with a seat for an anti-friction element, the first named cam member having a screw and the second named cam member having a limiting slot, the screw when outwardly turned acting to limit the oscillation of the second named cam member to thereby prevent the anti-friction elements from entering the seats in the crests of the cam, the screw when turned inward out of engagement with the slot permitting the second named cam member to be rotated from a position where the elements are in the valleys to a position where the elements are in the seats in the crests of the cam.

8. A faucet of the character described having a valve seat, a valve normally bearing against the seat and having a valve stem extending out of the body, the valve stem being screw-threaded at its upper end, a spring urging the valve to a closed position, and means for raising the valve against the action of the spring including a nut operatively bearing against the valve body and having screw-threaded engagement with the stem, the nut being manually rotatable to raise or lower the stem.

9. A faucet of the character described having a valve seat, a valve bearing against the seat and having a valve stem extending out of the body, the valve stem being screw-threaded at its upper end, a spring urging the valve to a closed position, means for raising the valve against the action of the spring including a nut having screw-threaded engagement with the stem, the nut being manually rotatable to raise or lower the stem, a carrier disposed above the faucet body and having anti-friction elements therein, and a manually oscillatable cam mounted above the carrier and rotatively engaging said nut, for raising and lowering the valve, said nut operatively bearing against said cam, the cam having a plurality of radial crests and valleys confronting the carrier and having a handle.

10. In a faucet having a valve seat, a valve, a stem, a head mounted upon the stem and having a concavity in its under face, a ball valve disposed in said concavity for coacting with the seat, and a spring bearing against the head and urging the valve to a closed position, the inner face of the concavity having radial grooves.

In testimony whereof I hereunto affix my signature.

JOHN M. KEELER.